United States Patent

[11] 3,588,131

| [72] | Inventor | Terence P. Nicholson<br>Stocksfield, England |
|---|---|---|
| [21] | Appl. No. | 694,622 |
| [22] | Filed | Jan. 2, 1968 |
| [45] | Patented | June 28, 1971 |
| [73] | Assignee | The Corrugated Packing & Sheet Metal Company Limited<br>Hamsterley, England<br>fractional part interest |
| [32] | Priority | Jan. 9, 1967 |
| [33] | | Great Britain |
| [31] | | 1,098/67 |

[54] SEALING MEANS
12 Claims, 10 Drawing Figs.

[52] U.S. Cl. .................................................... 277/206,
277/213, 277/236
[51] Int. Cl. ...................................................... F16j 15/32,
F16j 15/48
[50] Field of Search .......................................... 277/236,
206, 213, 180, 75, 205

[56] References Cited
UNITED STATES PATENTS

| 2,422,009 | 6/1947 | Goetze ........................... | 277/236X |
| 3,313,553 | 4/1967 | Gastineau ...................... | 277/236X |
| 3,204,971 | 9/1965 | Meriano ......................... | 277/206X |

FOREIGN PATENTS

| 550,298 | 3/1923 | France ........................... | 277/206 |

Primary Examiner—Houston S. Bell, Jr.
Attorney—Jones & Lockwood

ABSTRACT: A sealing washer or gasket has a hollow section formed by walls which converge but leave at least one opening between the hollow section and the high-pressure side of the seal so that an increase in fluid pressure has the effect of urging the walls outwardly thus tending to increase the sealing pressure with the surfaces between which it is located. Means are provided to prevent the opening being entirely closed by the normal pressures used to clamp the parts sealed by the washer or gasket.

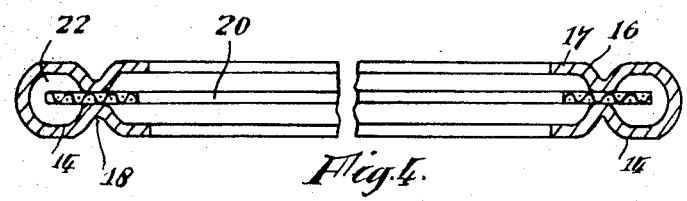
Fig. 4.
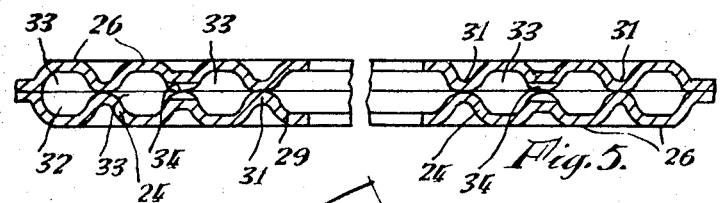
Fig. 5.
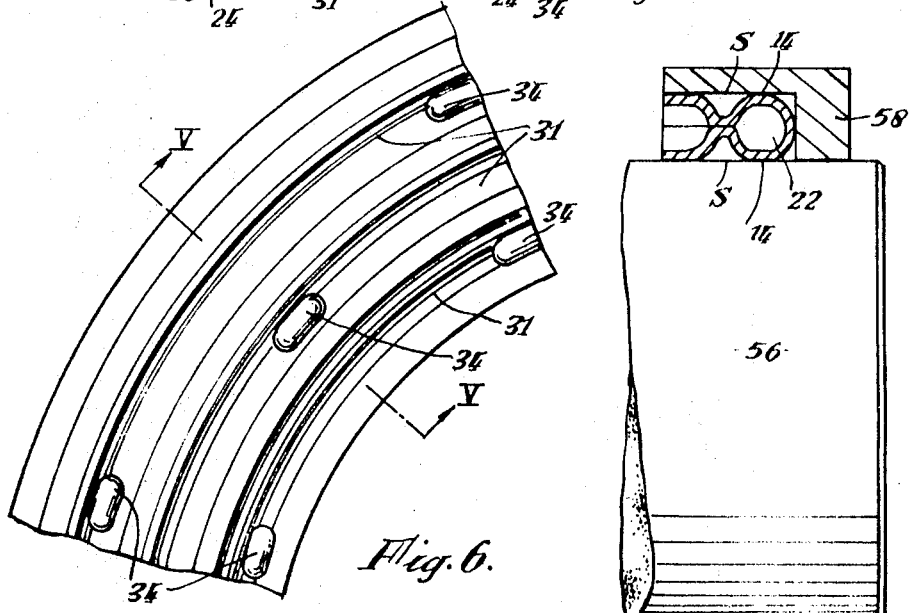
Fig. 6.
Fig. 10.
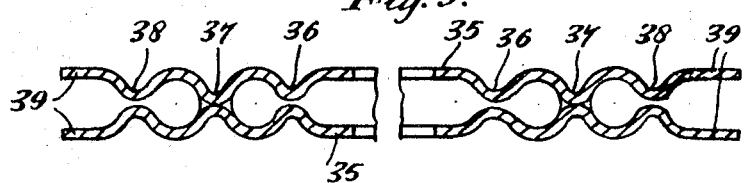
Fig. 9.

SEALING MEANS

This invention relates to sealing washers or gaskets and is particularly concerned with washers that are intended to maintain their sealing effect at elevated and/or subzero temperatures.

According to the invention, there is provided a sealing washer or gasket in the form of a ring or like closed profile having a hollow section formed by walls which converge to leave an opening or a plurality of discrete openings leading to the high-pressure side of the intended seal, means being provided, where the said opening is continuous, for preventing it being entirely closed by any normal clamping pressure applied to the washer or gasket in a direction tending to close the opening.

Thus the convergent walls may contact each other at spaced points in the region of their convergence, or they may contact each other along a plane leaving passages for the fluid to pass through into the annular hollow; in neither event will normal clamping pressure close the holes entirely and so cut off access of fluid to the hollow. In another form the convergent walls may fail to meet at any point, thus leaving a single annular mouth between them; in this event a layer of gauze or other material which permits the passage of fluid may be positioned between the lips forming the said mouth to prevent the mouth being wholly closed on clamping the washer.

At the region of maximum divergence of said walls away from the open face of the section, the outer surfaces of the walls provide the sealing contact faces of the washer when it is clamped in its associated assembly. An inner sealing line can also be provided by extending said walls radially inwards from their region of convergence and arranging that said extensions are divergent so that the end portions of the walls also can seal against the faces between which the washer is clamped. In certain instances it may be required to provide a series of seals at each sealing face of the washer and this may be done by forming said walls with a sinuous or undulating section so that each has a series of radially spaced regions of maximum divergence. In this latter event the walls may contact each other between regions of maximum divergence, thus, in effect, providing more than one annular hollow, but in this event, it is desirable that passages be left through these lines of contact so that fluid has access to all the hollows, and not merely the hollow on the high-pressure side of the seal.

A particular form of gasket or washer according to this invention takes the form of corrugated annuli which are continuously sealed together along a corrugation other than one of the end corrugations, thus forming at least one annular hollow on each side of the line of seal which is given contact with fluid outside the gasket or washer through an opening or plurality of openings.

A washer or gasket according to the invention is preferably used in association with means that allow the compression applied to it to be controlled, such means conveniently taking the form of one or more spacing elements or a recess containing the washer at the junction between the parts it is to seal against.

The invention will be more particularly described with reference to the accompanying drawings in which:

FIGS. 1 to 5 show metal washers or gaskets with alternative sectional forms according to the invention, FIG. 5 being a section along the line V–V of FIG. 6;

FIG. 6 is a view of part of the washer shown in FIG. 5 taken at right angles to FIG. 5;

FIG. 9 shows a double metal washer or gasket where openings are provided to the fluid on each side of the washer; and FIG. 10 shows a metal washer according to the invention for use round a rotating shaft.

Figure 1:
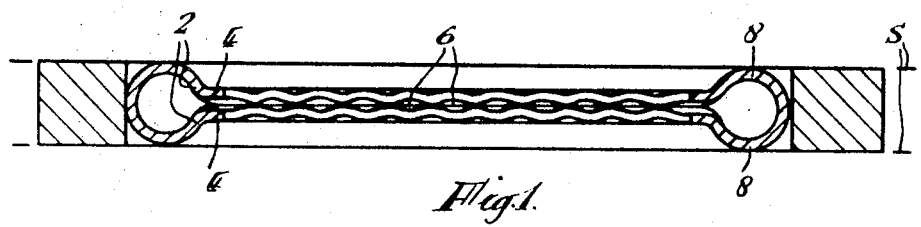

Referring to FIG. 1 the washer is a circular member and is intended to have high-pressure fluid in the space it encloses. The sectional form of the washer is substantially circular over the greater part of its extent but at the radially inner region opposed walls 2 converge to form a pair of lips 4 that have an axially undulating form so that when urged together as shown they will make contact at spaced points on their periphery. There are thus formed gaps 6 which allow the pressure of the contained fluid to be exerted within the section of the washer to urge the walls 2 apart and so maintain them, at their regions 8 of maximum divergence, in sealing contact with faces S between which the washer is clamped. Because of the contact between the lips 4 a relatively high-clamping pressure can be applied to the washer so that a high-pressure contact is established between the washer and the sealing faces. This assists bedding in at the sealing contact region which is otherwise difficult to achieve when a relatively hard material such as a metal must be used because of high temperatures at the seal for example.

As a result initial leakage, which would adversely affect the development of the seal when an increase in pressure differential is applied, can be reduced. In order to control the assembly pressure applied to the washer and so avoid distortion of its sectional form which would impair its pressure sealing qualities, spacing means may be provided in the form of a rigid outer ring 10 surrounding the hollow washer.

Figure 2:

In FIG. 2, opposed walls 12 converge radially inwardly from sealing regions 14 and have radially inner extensions 16 which diverge from a region 18 of minimum spacing. Unlike the undulating lips 4 of the previous example, the walls are parallel at the region 18 but have inserted between them a layer 20 of gauze or perforated or expanded metal that is intended to hold them apart while still allowing free communication between the interior hollow space 22 of the washer section and the space enclosed by the washer. A spacing ring 10 is also shown in this example.

The extensions 16 are arranged also to engage the sealing faces S and therefore two concentric lines of sealing are formed. It will be noted that because of the inner seal the pressure sealing effect at the outer seal will act over the whole inner surface of the space 22 and will not, as in the previous example, be partly counterbalanced by the same fluid pressure acting on the outer faces of the walls at their convergent regions where they extend radially inwardly to the region 18.

Figure 3:
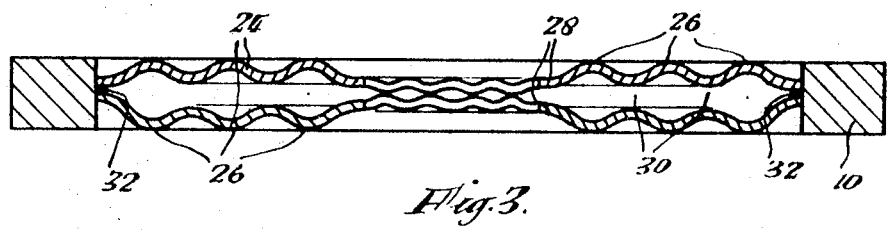

The washer shown in FIG. 3 has axially opposed walls 24 of a sinuous section so that a series of concentric lines of sealing 26 are formed. It will be appreciated that although lips 28 analogous to the lips 4 of FIG. 1 are shown here, a layer similar to the layer 20 of FIG. 2 can be inserted instead. It will usually be sufficient for the spacing engagement between the walls 24 to be confined only to the region of the lips 28, because this will ensure, if the sealing faces S are reasonably accurate, that radially outer regions of the interior of the washer section are not sealed off at the convergent portions 30. Again, a spacing ring 10 can be used with the washer. While the examples of FIGS. 1 and 2 have been shown as being formed integrally from a single piece of sheet metal. FIG. 3 shows an alternative method of construction in which the walls 24 are formed separately and are then sealingly welded or brazed at their outer periphery 32.

When the washer or gasket is made of two wall elements thus sealed together, it is possible to provide it in irregular or noncircular form, or in a form affording a plurality of circular or noncircular apertures, which may as required be of the same or different sizes and/or shapes.

It will be appreciated that in each of FIGS. 1 to 3 the washers are shown in their compressed condition, i.e. with the sealing surfaces S clamped down on either side of the ring 10; before clamping the washers the opposed sealing regions 8, 14, 26 will be separated by a distance which is greater than the axial thickness of the ring 10.

It is preferred that the opposed walls on the high pressure side of the intended seal should diverge to a region of maximum divergence as shown in FIG. 2, and thus engage the sealing faces. In FIG. 4, which bears the same reference numerals as FIG. 2 to designate equivalent parts, the extensions 16 have been flattened off at 17 to give good contact with the sealing surfaces; the walls at the sealing regions 14 have likewise been flattened. A ring 20 of gauze between the walls at the region 18 has been shown wide enough in a radial direction to ensure that any slight displacement during manufacture will still leave part of the ring between the walls right round their circumference.

The washer shown in FIGS. 5 and 6 is somewhat similar to FIG. 3 in that there are three concentric lines of sealing 26, though there is a further inward extension 29 which also gives contact with the sealing surface and is flattened off in the same manner as in FIG. 4. The profile of the washer has also been flattened at the lines of sealing 26. The walls 24 meet along the circles 31 between each of the lines of sealing 26 and again between the innermost line of sealing 26 and the extension 29 but, to allow passage of fluid into the three concentric annular hollows 33 there are provided a plurality of passages 34 at intervals round the circumference of the circles 31, which passages give communication between the hollows 33 and between the innermost hollow 33 and the high-pressure side of the seal to be formed by the washer.

It is preferred to use for the washer material a relatively hard metal such as steel or its alloys with nickel for example. In order to provide for bedding of the washer at its lines of sealing, this material can serve as a main core of the washer and be coated or plated with a softer material suited to the temperature and chemical characteristics of the pressure fluid. In particular cases, such materials as aluminum, nickel or polytetrafluoroethylene may be suitable choices or a heat-resistant varnish may be used.

Figure 7:
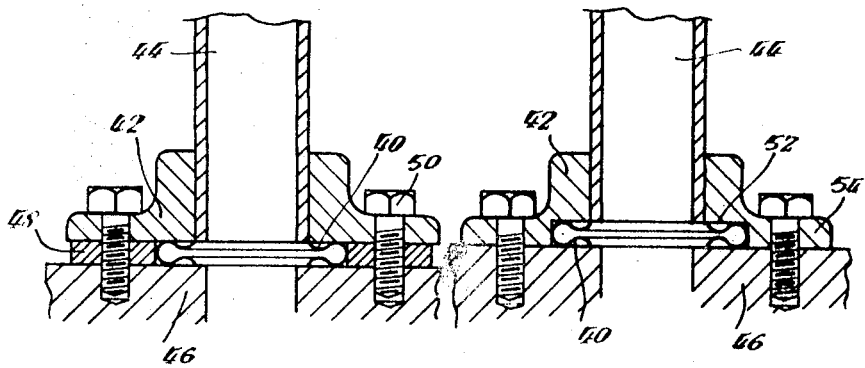
FIGS. 7 and 8 illustrate alternative assembly arrangements for the washers of FIGS. 1 to 6.
Figure 8:
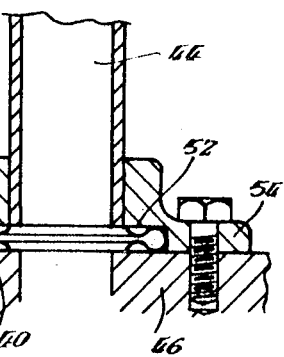

FIG. 7 illustrates the assembly of a washer 40 according to the invention to seal the joint between a bolted flange 42 of pipe 44 and a mounting plate 46. Spacing means are shown at 48 and it should be appreciated that such means need not completely surround the washer 40 unless it is required to provide a continuous radial support for the washer. Thus, the means may comprise individual packing washers at each of the bolts 50 so that, at the most, the washer 40 is contacted at a few spaced points on its outer periphery. In FIG. 8 the spacing means is formed by machining a recess 52 in the flange 42 within which the washer 40 can seat. The outer peripheral region 54 of the flange then performs the same function as the spacing means 48 in FIG. 7.

Each of the washers illustrated so far is intended for the case where the high-pressure side of the seal is radially inward; where the high-pressure side of the seal is radially outward, e.g. where the washer is for vacuum pipelines the opening or openings from the hollow formed by the washer will be directed radially outwardly instead of inwardly. For cases where the higher pressure may be either radially inward or radially outward, use may be made of the washer shown in FIG. 9. Essentially this washer takes the general form of two annuli, each with 3 corrugations 36, 37, 38, the annuli being continuously welded together round the corrugation 37 to prevent any movement of fluid from the annular hollows 33 on each side of the line of weld. The innermost and outermost extensions 35 and 39 respectively of the walls are flattened out to give sealing contact.

The gasket or washer of my invention can be used round shafts, and FIG. 10 shows a washer adapted for this purpose. The cross section shown either at the top or at the bottom of the FIG. between the shaft 56 and the housing 58 is analogous to that of FIGS. 2 and 6 though the communication between the annular hollow 22 and the high-pressure side of the seal has been shown as including passages 34 as in FIGS. 7 and 8. It can readily be seen however that, as the faces S between which the washer is located are cylindrical instead of annular, the sealing regions 14 thus form concentric rings in the same plane and the passages 34 lead axially from the hollow 22 instead of radially. It will readily be appreciated that, instead of a single hollow 22, there may be a plurality of hollows arranged axially, and the passage or passages from the hollows may take any of the forms illustrated in FIGS. 1 to 6.

I claim:

1. A sealing ring having a hollow section formed by walls which converge along a path to leave at least one opening leading to the high-pressure side of the intended seal, abutment means being provided in the path of convergence of the convergent walls for preventing these walls from being brought by normal clamping pressure into continuous abutting relation so as to deny fluid access between the said convergent walls to the hollow section.

2. A sealing ring according to claim 1 wherein the convergent walls are shaped to contact each other at least on the application of normal clamping pressure at spaced points in the region of their convergence.

3. A sealing ring according to claim 1 wherein the convergent walls form a pair of lips of undulating form, which are shaped to make contact with each other at spaced points round the periphery.

4. A sealing ring according to claim 1 wherein the convergent walls fail to meet at any point, thus leaving a mouth between them, a layer of gauze or other material which permits the passage of fluid being positioned between the lips forming the mouth to prevent the mouth being wholly closed on clamping the washer.

5. A sealing ring according to claim 1 wherein the said walls are extended radially inwards from their region of convergence, the said extensions being made divergent so that the end portions of the walls also can seal against the faces between which the washer is clamped.

6. A sealing ring according to claim 5 wherein the said extensions are flattened off at their ends to give good sealing contact at these points.

7. A sealing ring according to claim 1 wherein all the sealing contact faces of the washer are flattened off to give good sealing contact at these points.

8. A sealing ring according to claim 1 wherein a plurality of seals are provided at each sealing face of the washer by providing the walls with an undulating section so that each has a series of spaced regions of maximum divergence.

9. A sealing ring according to claim 8 wherein the walls contact each other between regions of maximum divergence thus providing more than one annular hollow, passages being left through these lines of contact.

10. A sealing ring according to claim 1 which takes the form of corrugated annuli which are continuously sealed together along a corrugation other than one of the end corrugations, thus forming at least one annular hollow on each side of the line of seal which is given contact with fluid outside the sealing ring through an opening or plurality of openings.

11. A joint comprising two members having opposed faces between which a seal is to be made, a ring-shaped sealing washer of hollow section located between said faces, spacing means located round said sealing washer and bolt means arranged to compress the washer and clamp the said faces firmly on said spacing means, the sealing washer having a maximum axial thickness in its uncompressed condition which is greater than the spacing distance defined by the spacing means and being formed by walls which converge along a path to leave at least one opening leading to the high-pressure side of the intended seal, abutment means being provided in the path of convergence of the convergent walls for preventing these walls from being brought by the clamping pressure of the bolt means into continuous abutting relation so as to deny fluid access between the said convergent walls to the hollow section.

12. A joint comprising two members having opposed mating faces, one of the members having an annular recess in one of the mating faces, a ring-shaped sealing washer of hollow section in said recess, the sealing washer having a maximum axial thickness in its uncompressed condition which is greater than the depth of the recess, and bolt means for compressing the washer and clamping together the two members along their mating faces, the sealing washer being formed by walls which converge along a path to leave at least one opening towards the axis of the washer, abutment means being provided in the path of convergence of the convergent walls for preventing these walls from being brought by the clamping pressure of the bolt means into continuous abutting relation so as to deny fluid access between the said convergent walls to the hollow section.